United States Patent [19]

Kirk

[11] 4,430,528
[45] Feb. 7, 1984

[54] TELEPHONE CALL COUNTER

[76] Inventor: Norbert A. Kirk, 43 E. Ohio St., Room 930, Chicago, Ill. 60611

[21] Appl. No.: 311,768

[22] Filed: Oct. 15, 1981

[51] Int. Cl.³ .......................................... H04M 15/10
[52] U.S. Cl. ..................... 179/7 R; 235/68
[58] Field of Search .................. 179/7 R, 11; 235/68, 235/123

[56] References Cited

U.S. PATENT DOCUMENTS 1,243,610 10/1917 Jones ..................................... 235/68

Primary Examiner—Stafford D. Schreyer
Attorney, Agent, or Firm—Larson and Taylor

[57] ABSTRACT

An apparatus and method are disclosed for counting the number of calls made by a user during a counting period. The apparatus includes a telephone having a curved handset which is displaceable approximately 90° from a rest position to a use position. Attached to the telephone handset at a slight angle from horizontal is a relatively flat counter. The counter uses a series of zigzag tracks and a ball movable in the tracks to count the number of calls made by the user. In the method of the present invention, a call made by the user is counted by tilting the handset slightly to one side as the handset is raised to make the call and tilting the handset slightly to the same side as the handset is lowered after completing a call. In this manner, the ball in the counter is advanced along the zigzag track. Incoming calls and uncompleted calls are not counted by tilting the handset slightly to one side or the other as the handset is raised and by tilting the handset to the opposite side as the handset is lowered so that the ball is returned to the same peak in the zigzag track.

20 Claims, 6 Drawing Figures

TELEPHONE CALL COUNTER

FIELD OF THE INVENTION

This invention relates generally to an apparatus and method for counting the number of calls made by a user during a counting period and more particularly to an apparatus and method which counts the calls made by a user but which does not count incoming calls or uncompleted calls.

BACKGROUND OF THE INVENTION

Monthly charges for telephone service in the United States is frequently calculated according to the number of calls which are made by the user. This type of service can result in a savings to the consumer so long as the number of calls allowed is not greatly exceeded. For this reason, there is a need for a simple device which allows the user to keep track of the number of calls which have been made during a specific counting period and to let the user know how many more calls can be made.

Prior art devices have been proposed for counting the number of calls made by user which are located on the handset of the telephone. These devices having included drum or disc dials which can be advanced by the user when making a call. A drawback of devices of this type is that the user must separately act to change the dials in addition to performing the acts necessary to make a call.

There has also been disclosed in the prior art in U.S. Pat. No. 1,243,610 (JONES) a counter which is actuated by the rotational movement of a pipe on a sewer flush tank. This counter includes a ball which moves along a sinuous path of travel as the counter is oscillated each time.

Although the prior art has disclosed counters for telephones and counters in general, a counter has not been disclosed which is selectively actuated by the user during simple use of the phone.

SUMMARY OF THE INVENTION

In accordance with the present invention, an apparatus and method are provided for counting the number of telephone calls made by a user during a counting period. The apparatus includes a telephone having a curved handset which is displaceable approximately 90° from a rest position to a use position. Attached to the handset is a relatively flat counter. This counter is oriented in a plane so that the counter is offset somewhat from horizontal. The counter includes a plurality of zigzag or sinusoidal tracks which are arranged in rows. When attached to the handset, these rows are perpendicular to the longitudinal axis of the handset. When viewing the handset in the rest position, with the counter somewhat below horizontal, the zigzag tracks have alternating uppermost peaks and lowermost peaks. Crossover tracks are provided to connect the uppermost peak at the end of one zigzag track to the lowermost beginning portion of a succeeding zigzag track. A ball is located and held in the zigzag track so that the ball rolls freely. The lowermost peaks of the zigzag tracks are consecutively numbered.

In order to use the counter to count calls made by the user, the following procedure is followed. After attaching the counter to the handset, the handset is simply tilted slightly to one side as the handset is raised to make a call. As the handset is raised approximately 90°, the ball is advanced in the zigzag track of the counter to be unnumbered peak. Then, after the call is made, as the handset is lowered to the rest position, the handset is again slightly tilted to one side. This causes the ball to then advance to the next numbered peak. Thus, through the simple act of making a call, the call is easily counted. The user then can see the location of the ball and determine the number of calls which have been made during the counting period.

In a preferred embodiment of the present invention, the counter is instead provided with a return track connecting the first numbered lowermost peak with the last numbered lowermost peak. In this manner, the ball is returned to the first numbered lowermost peak after leaving the last numbered lowermost peak. The counter can also be provided with a dial means to indicate the number of times the ball has travelled past the last numbered lowermost peak.

In an alternative embodiment of the present invention, an access door is provided at the first numbered lowermost peak and at the last numbered lowermost peak so the ball can be inserted to start the counting and withdrawn after counting is completed.

In order not to count an incoming call, the handset is tilted slightly to the other side as the handset is raised and lowered. To accommodate this, the end of each zigzag track is also provided with an uppermost peak.

In the preferred embodiment of the present invention, the crossover tracks are inclined downwardly from the uppermost peak of one zigzag track to the lowermost peak of the succeeding zigzag track. In addition, the zigzag tracks and the crossover tracks have biasing means to advance the ball to the next lowermost peak without any substantial tilting of the handset as the handset is raised or lowered.

When the user tilts the handset to one side as the handset is raised in anticipation of making a call, and the call cannot be completed for any reason, the ball must be returned to the lowermost numbered peak from which it came. In order to do this, the handset is simply tilted to the other side as the handset is returned to the rest position and this causes the ball to return to the lowermost numbered peak from which it came.

Other features and advantages of the present invention are stated in or apparent from the detailed description of presently preferred embodiments of the invention found hereinbelow.

DETAILED DESCRIPTION OF THE PREFERRED EMBODIMENTS

Figure 1:
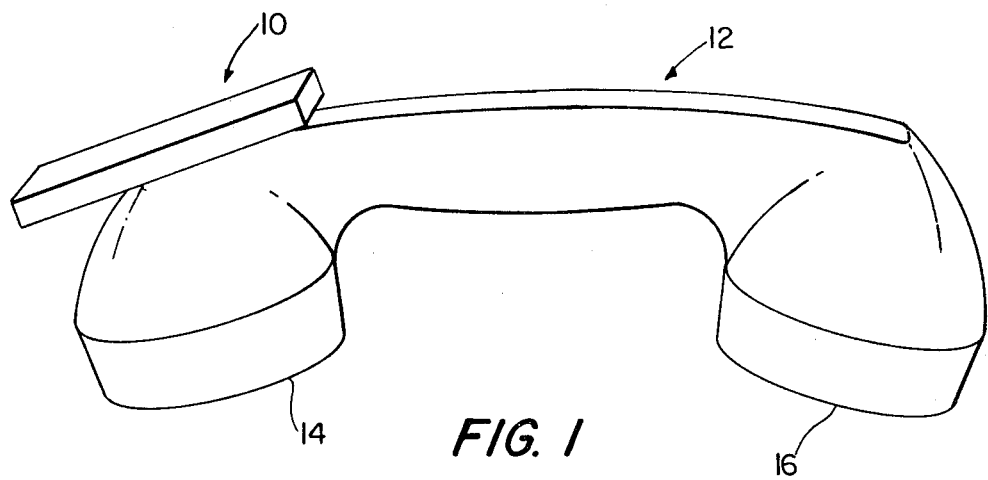
FIG. 1 is a perspective view of the handset and counter of the present invention.

With reference now to the drawings in which like numerals represent like elements throughout the several views, a presently preferred embodiment of the present invention is depicted in FIGS. 1 through 4 and comprises a counter 10 attached to a handset 12 as shown in FIG. 1. Handset 12 is a common handset normally received in a substantially horizonal position in the cradle of a telephone apparatus. Handset 12 includes an earphone 14 and a mouthpiece 16. Counter 10 is preferably attached to handset 12 opposite earphone 14. As shown in FIG. 1, when handset 12 is substantially horizontal, counter 10 is located at an angle somewhat inclined from horizontal. Preferably, the angle of inclination of counter 10 from horizontal is approximately 15° although an angle of from 5°-45° is satisfactory.

Figure 2:
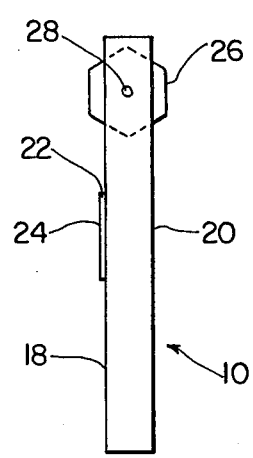
FIG. 2 is a side elevational view of the counter of the present invention.
Figure 3:
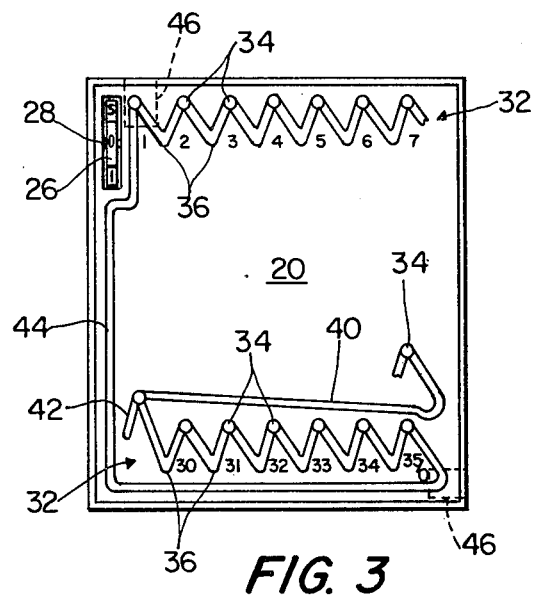
FIG. 3 is a front elevational view of the counter of the present invention.

Counter 10 is depicted in greater detail in FIGS. 2 and 3 and includes a back 18 and a clear front 20. Attached to back 18 is a rectangular foam pad 22 having an adhesive layer 24. Adhesive layer 24 is used to quickly and simply attach counter 10 to handset 12. Located in one corner of counter 10 is a drum dial 26. Drum dial 26 has six faces which are consecutively numbered from 0 to 5. An axle 28 is used to mount drum dial 26 for rotation so that one of the numbers is uppermost relative to front 20. A suitable rubber bushing or the like frictionally engages drum dial 26 so that drum dial 26 does not move freely but is movable by the user.

Schematically depicted in FIG. 3 are portions of a plurality of zigzag tracks 30 which are arranged in parallel rows 32. When counter 10 is oriented as depicted in FIG. 1 at an angle to horizontal, rows 32 are oriented so that the longitudinal axis of rows 32 are perpendicular to the longitudinal axis of handset 12. In addition, with counter 10 oriented on handset 12, zigzag tracks 30 are oriented such that zigzag tracks 30 have lowermost peaks 34 and uppermost peaks 36. Lowermost peaks 34 are numbered consecutively as shown in FIG. 3 from 1 to 35. The lowermost peak at 35 is also numbered 0. Lowermost peaks 34 are preferably formed from holes located along zigzag tracks 30.

Figure 4:
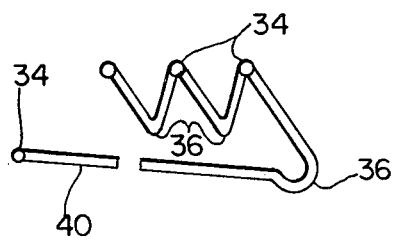
FIG. 4 is an enlarged view of a portion of a zigzag track and a crossover track depicted in FIG. 3.

Counter 10 is also provided with a plurality of crossover tracks 40 which are depicted in FIG. 3 and in greater detail in FIG. 4. As shown, crossover tank 40 connects the uppermost peak 36 at one end of a row 32 with the lowermost peak 34 of the next row 32. As shown best in FIG. 4, crossover track 40, when counter 10 is attached to handset 12, is inclined downwards from uppermost peak 36 located at the end of row 32 toward the lowermost peak 34 located at the beginning of the next row 32. If desired, crossover track 40 can also be somewhat deeper in counter 10 where crossover track 40 meets lowermost peak 34 than at the beginning adjacent uppermost peak 36. It should also be noted that each zigzag track 30 includes a portion 42 extending away from crossover track 40.

Also depicted in FIG. 3 is a return track 44 running from the uppermost peak adjacent number 35/0 to the lowermost peak adjacent number 1. In another preferred embodiment of the present invention, return track 44 can be omitted and access doors 46 (shown in dotted lines) can be provided over the uppermost peak 36 adjacent number 35/0 and the lowermost peak adjacent number 1. The formation of zigzag tracks 30, crossover tracks 40, and return track 44 in counter 10 can be provided in a number of ways. The purpose of these tracks is to allow a ball 50 to roll freely in these tracks as handset 12 is moved from the rest position shown in FIG. 1 to a use position with earphone 14 substantially vertically above mouthpiece 16. Therefore, tracks 30, 40 and 44 are preferably formed either in back 18 or front 20 with the spacing between back 18 and front 20 narrow enough to keep ball 50 in tracks 30, 40, and 44. Alternatively, mating tracks 30, 40, and 44 can be formed in both back 18 and front 20 with the spacings between back 18 and front 20 small enough to maintain ball 50 in the tracks.

Figure 5:
FIG. 5 is a cross-sectional side view of an alternative embodiment of a track in the counter of the present invention.

Ball 50 is preferably made of a metal such as stainless steel. However, if it is desired for ball 50 to move somewhat slower, ball 50 could be also made of a plastics material. In addition, in order to slow the movement of ball 50, ridges 52 can be provided in a track such as track 30 depicted in FIG. 5. Alternatively, slots could be provided in place of ridges 52.

Figure 6:
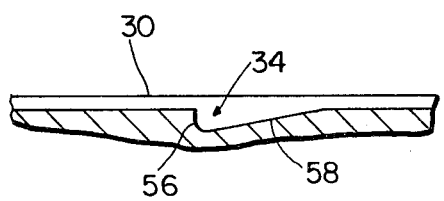
FIG. 6 is a developed view of an alternative embodiment of a peak of a track of a counter of the present invention.

Depicted in FIG. 6 is a developed view of a lowermost peak 34. As shown, lowermost peak 34 includes a sharply inclined portion 56 and a gently inclined portion 58. Sharply inclined portion 56 is adjacent to the previous uppermost peak in zigzag track 30 while gently inclined portion 58 is adjacent to the next uppermost peak in zigzag track 30. With this configuration ball 50 is urged toward the next uppermost peak 36.

In use, counter 10 is used to count telephone calls made by the user in the following manner. Initially, counter 10 is attached to handset 12 by use of the adhesive layer 24 on foam pad 22. Preferably, counter 10 is attached to handset 12 at an angle of approximately 15° with the zigzag tracks perpendicular to the longitudinal axis of handset 12 and with lowermost peaks 34 lowermost relative to uppermost peaks 36. The user then determines when the billing cycle for his telephone begins so that counter 10 can be used from that day forward for the billing period. When the billing period or counting period starts, drum dial 26 is rotated until the number 0 is uppermost and ball 50 is moved to lowermost peak 34 adjacent number 35/0. Ball 50 is easily moved to the appropriate lowermost peak by tilting handset 12 to move ball 50 along the appropriate tracks. Where access doors 46 are provided, ball 50 is simply inserted into access door 46 located above uppermost peak 36 adjacent number 35/0. Handset 12 is then placed in the cradle of the telephone device and the user makes sure that ball 50 is located in the lowermost peak 34 adjacent number 35/0.

When the user desires to make a telephone call, the user simply picks up handset 12 and tilts handset 12 slightly to the right between 5° to 50° and preferably a convenient 10° to 30°. This causes ball 50 which was located in lowermost peak 34 adjacent number 35/0 to travel to the uppermost peak 36 to the right of number 35/0. Then, after the user has made a call, the user simply tilts handset 12 slightly to the left as the user replaces handset 12 in the cradle. This causes ball 50 to travel first to the left in return track 44 and then downward in return track 44 to the lowermost peak 34 adjacent the number 1. The user can then clearly see ball 50 in lowermost peak 34 adjacent number 1 and thus knows that one call has been made during the counting period. The next time the user makes a call, the user simply picks handset 12 up while tilting handset 12 slightly to the right and after the call replaces handset 12 while still tilting handset 12 slightly to the right. This causes ball 50 to move initially to the uppermost peak located between numbers 1 and 2 and then to the lowermost peak located adjacent number 2. The user can then clearly see ball 50 in the lowermost peak adjacent number 2. Each time the user makes a call, the same procedure is repeated until ball 50 is located in the lowermost peak 34 adjacent number 7. At that point, it is necessary to move ball 50 to the lowermost peak 34 of the next row when the next call is made. To do this, handset 12 is picked up in the same manner tilting it slightly to the right. However, upon replacing handset 12 after making the call, the user tilts handset 12 to the left instead. This causes ball 50 to roll downward along crossover track 40 to the lowermost peak 34 of the next row 32. The normal procedure for advancing ball 50 is then used for that row as well. This same procedure is followed for all of the rows. If ball 50 is returned to lowermost peak 35 during the counting period, the next time a call is made and ball 50 is advanced to lowermost peak 34 adjacent number 1, drum dial 26 is rotated so that the number 1 is uppermost. This serves to indicate that ball 50 has been around counter 10 one time so that the number of counts for the counting period is equal to the number at which ball 50 is currently located plus the maximum number on counter 10. In the embodiment of the present invention depicted in FIG. 3, the maximum number on counter 10 is 35 so that the number adjacent ball 50 is added to the number 35 to determine the number of calls made during the counting period. In a similar manner, as ball 50 goes around counter 10 twice, drum dial 26 is simply moved to the number 2 and the calls calculated on that basis.

If the user picks up handset 12 to make a call which is not completed, the user simply tilts handset 12 in the opposite direction for advancing ball 50 so that ball 50 returns to the lowermost peak 34 from which it came.

When the user receives an incoming call which should not be counted, the user simply tilts handset 12 to the opposite side for advancing ball 50 as handset 12 is raised. When the incoming call is completed, handset 12 is lowered and tilted in the same direction for advancing ball 50 which then advances back to the lowermost peak 34 from which it initially came. In this manner, incoming calls are not counted. It should be noted that zigzag tracks 30 are provided with portions 42 to make the not counting of incoming calls easier. Thus, when ball 50 is located in lowermost peak 34 at the beginning of a row 32, when an incoming call is received, the user simply picks up handset 12 and tilts it slightly to the left as the user would with any other incoming call. Thus, ball 50 drops into portions 42 and after the call handset 12 is tilted to the right and put back on the cradle as with any other incoming call.

In order to construct counter 10 so that handset 12 need not be tilted to advance ball 50, lowermost peaks 34 can be constructed according to FIG. 6. Thus, as handset 12 is raised, ball 50 rolls easily down gently inclined portion 58 towards the next uppermost peak. The next uppermost peak is similarly constructed so that as handset 12 is lowered, ball 50 again flows along gently inclined portion 58 to the next lowermost peak. As handset 12 is moved, sharply inclined portion 56 prevents ball 50 from moving backwards except upon a positive tilting of handset 12. Obviously, a positive tilting of handset 12 can be provided by the user when it is desired not to advance ball 50 from an uppermost peak.

It should also be noted that uppermost peaks 36 located adjacent crossover tracks 40 have a slight U-shaped configuration inclined away from the adjacent crossover track 40. With this configuration, when ball 50 is located in this uppermost peak and handset 12 is replaced on the cradle, ball 50 gathers a little momentum so that ball 50 is easily propelled along crossover track to the next lowermost peak 34.

It should be noted that where a return track 44 is omitted and access doors 46 are provided, ball 50 must be moved by the user from lowermost peak adjacent number 35/0 to lowermost peak 34 adjacent number 1 after ball 50 has completed one cycle. Counter 10 can be provided in a variety of colors to coordinate with the telephone of the user, in a variety of shapes such as triangular or oval, and the number of lowermost peaks and hence the number of counts for counter 10 can be varied as needed.

It should further be noted that a preferred configuration of zigzag track 30 is depicted in FIG. 4. As shown, uppermost peaks 36 are not located equidistant between adjacent lowermost peaks 34. Instead, uppermost peaks 36 are shifted somewhat towards the next lowermost peak 34. This offsetting of uppermost peaks 36 causes the portion of zigzag track 30 running from a lowermost peak 34 to the succeeding uppermost peak 36 to have a longitudinal axis at an acute angle to the longitudinal axis of row 32 which is less than the acute angle formed by the longitudinal axis of the portion of zigzag track 30 running from an uppermost peak 36 to a succeeding lowermost peak 34. In other words, uppermost peak 36 is approaching a position where it is almost directly above the next lowermost peak 34 so that ball 50 tends to roll from uppermost peak 36 to the succeeding lowermost peak 34 naturally with little or no rocking of handset 12 as handset 12 is moved from the use position to the rest position.

Thus while the invention has been described in detail with respect to exemplary embodiments thereof, it will be understood by those of ordinary skill in the art that these and other variations and modifications may be effected in the exemplary embodiments within the scope and spirit of the invention.

I claim:
1. A counting device comprising:
a relatively planar member having opposed ends and opposed sides;
means for attaching said member to an object such that said planar member is inclined relative to horizontal with one of said opposed ends uppermost and above the other opposed end which is lowermost;
a plurality of zigzag tracks arranged in rows in said member with the longitudinal axes of the rows oriented substantially transverse to a line passing through said uppermost and lowermost opposed ends, said zigzag tracks having lowermost peaks which are nearest said lowermost end and uppermost peaks which are nearest said uppermost end, said zigzag tracks further having an uppermost peak at each row end;
a plurality of crossover tracks connecting the uppermost peak at the end of one zigzag track with the lowermost peak at the beginning of a succeeding zigzag track, said uppermost peak at the end and said lowermost peak at the beginning being adjacent opposite sides of said member;
a ball located in one of said zigzag tracks, said ball rolling freely in said zigzag tracks and crossover tracks;
means for keeping said ball in said zigzag tracks and said crossover tracks; and means for numbering consecutively said lowermost peaks of said zigzag tracks such that where the object is moved in a predetermined fashion to raise said lowermost end above said uppermost end and to return said lowermost end to a position below said uppermost end, said ball advances to the next numbered peak except when the object is additionally rocked in a predetermined manner about a longitudinal axis passing through the opposed ends of said member whereby said ball returns to the same numbered peak.

2. A counting device as claimed in claim 1 wherein said member further includes an access door provided in said means for keeping at the first numbered lowermost peak and an access door provided at the succeeding uppermost peak adjacent the last numbered lowermost peak such that said ball can be inserted to start counting and withdrawn after counting is completed.

3. A counting device as claimed in claim 1 further including a return track connecting the first numbered lowermost peak with the last numbered lowermost peak such that said ball is returned to said first numbered lowermost peak to continue counting after the number of calls exceeds the number assigned to the last numbered lowermost peak.

4. A counting device as claimed in claim 3 further including a dial means attached to said member having numbers thereon which is adjustable to indicate the number of times said ball has travelled along said return track.

5. A counting device as claimed in claim 1 wherein said crossover tracks are inclined downwardly from the uppermost peak of one zigzag track to the lowermost peak of the succeeding zigzag track.

6. A counting device as claimed in claim 1 wherein said crossover tracks have biasing means to advance said ball to the next lowermost peak.

7. An apparatus for counting the number of telephone calls made by a user during a counting period comprising:
a telephone having an elongate handset, said handset having a longitudinal axis which is substantially horizontal during nonuse and substantially vertical during use;
a relatively planar counter having opposed ends and opposed sides;
means for attaching said counter to said handset such that said counter is inclined somewhat to horizontal with one of said opposed ends uppermost and above the other opposed end which is lowermost;
a plurality of zigzag tracks in said counter which are arranged in rows with the longitudinal axes of the rows oriented substantially transverse to a line passing through said uppermost and lowermost opposed ends, said zigzag tracks having lowermost peaks which are nearest said lowermost end and uppermost peaks which are nearest said uppermost end, said zigzag tracks further having an uppermost peak at each row end;
a plurality of crossover tracks connecting the uppermost peak at the end of one zigzag track with the lowermost peak at the beginning of a succeeding zigzag track, said uppermost peak at the end and said lowermost peak at the beginning being adjacent opposite sides of said counter;
a ball located in one of said zigzag tracks, said ball rolling freely in said zigzag tracks and said crossover tracks;
means for keeping said ball in said zigzag tracks and said crossover tracks; and
means for numbering consecutively said lowermost peaks of said zigzag tracks being constructed and arranged such that during normal use of said handset, when said handset is moved from its rest position to its use position and thereafter from its use position to its rest position, said ball moves in said track from a lowermost peak to an adjacent lowermost peak so that a cell is counted and whereby, during normal use of said handset when said handset is moved from its rest position to its use position and thereafter from its use position to its rest position and said handset is additionally rocked in a pre-determined manner about the longitudinal axis of said handset, said ball returns to the same lowermost peak so that a call is not counted.

8. A telephone call counting apparatus as claimed in claim 7 wherein said counter further includes an access door provided at the first numbered lowermost peak and an access door provided at the last numbered lowermost peak such that said ball can be inserted to start counting and withdrawn after counting is completed.

9. A telephone counting apparatus as claimed in claim 7 wherein said counter further includes a return track connecting the first numbered lowermost peak with the last numbered lowermost peak such that said ball is returned to said first numbered lowermost peak to continue counting after the number of calls exceeds the number assigned to the last numbered lowermost peak.

10. A telephone counting apparatus as claimed in claim 9 wherein said counter further includes a dial means having numbers thereon which is adjustable to indicate the number of times said ball has travelled along said return track during the counting period.

11. A telephone call counting apparatus as claimed in claim 7 wherein said crossover tracks are inclined downwardly from the uppermost peak of one zigzag track to the lowermost peak of the succeeding zigzag track.

12. A telephone call counting apparatus as claimed in claim 7 wherein said crossover tracks have biasing means to advance said ball to the next lowermost peak without any substantial rocking of said handset as said handset is raised or lowered during normal use.

13. A method of providing a count of the number of times that a telephone having a handset is used which comprises:
providing telephone call counting apparatus as claimed in claim 7;
using said telephone a plurality of times to make outgoing calls and to receive incoming calls; and
rocking the handset of the telephone about its axis in a predetermined manner during normal use of the handset to distinguish between uses to be counted and uses not to be counted, to provide a count of the number of times that said handset is used.

14. A method for counting calls as claimed in claim 13 wherein during normal use the handset is rocked slightly in one direction about the longitudinal axis of the handset to cause the ball to advance to the next numbered peak.

15. A method for counting calls as claimed in claim 14 wherein during normal use the handset is rocked slightly in one direction around the longitudinal axis of the handset as the longitudinal axis of the handset moves from horizontal to vertical and wherein the handset is rocked slightly in the opposite direction about the longitudinal axis of the handset as the longitudinal axis of the handset moves from vertical to horizontal such that the ball returns to the same number peak and incoming calls or uncompleted calls are not counted by the counter.

16. A method for counting calls as claimed in claim 15 wherein the counter is provided with a drum dial having numbers thereon and further including the steps of rotating the drum dial one increment to indicate when the ball has traversed all of the rows of zigzag track and returning the ball to the beginning of the first zigzag track to continue counting additional calls.

17. Apparatus according to claim 7 wherein said track is constructed and arranged such that, when, during normal use, said handset is moved from its rest position to its use position and thereafter returned to its rest position without rocking said handset in its longitudinal axis, said ball advances to the succeeding lowermost peak in said zigzag track to indicate a counted use of said handset.

18. Apparatus according to claim 7 wherein said track is constructed and arranged such that, when, during normal use, said handset is moved from its rest position to its use position and thereafter returned to its rest position without rocking said handset on its longitudinal axis, said ball returns to its lowermost peak whereby use of the handset is not counted.

19. Apparatus according to claim 7 wherein said track is constructed and arranged such that when said handset is rocked in a first direction on its longitudinal axis, said ball, during normal use of said handset, will move along said track to an adjacent lowermost peak to count a use of said handset and such that, when said handset is rocked in a direction opposite to said first direction, said ball, during normal use of said handset, will return to its lowermost peak whereby use of the handset is not counted.

20. A counting device comprising:
a relatively planar member having opposed ends and opposed sides;
means for attaching said member to an object such that said planar member is inclined relative to horizontal with one of said opposed ends uppermost and above the other opposed end which is lowermost;
a plurality of zigzag tracks arranged in rows in said member with the longitudinal axes of the rows oriented substantially transverse to a line passing through said uppermost and lowermost opposed ends, said zigzag tracks having lowermost peaks which are nearest said lowermost end and uppermost peaks which are nearest said uppermost end;
a plurality of crossover tracks connecting the uppermost peak at the end of one zigzag track with the lowermost peak at the beginning of a succeeding zigzag track, said uppermost peak at the end and said lowermost peak at the beginning being adjacent opposite sides of said member;
a ball located in one of said zigzag tracks, said ball rolling freely in said zigzag tracks and crossover tracks;
means for keeping said ball in said zigzag tracks and said crossover tracks;
means for numbering consecutively said lowermost peaks of said zigzag tracks such that where the object is moved in a predetermined fashion to raise said lowermost end above said uppermost end and to return said lowermost end to a position below said uppermost end, said ball advances to the next numbered peak;
a return track connecting the first numbered lowermost peak with the last numbered lowermost peak such that said ball is returned to said first membered lowermost peak to continue counting after the number of calls exceeds the number assigned to the last numbered lowermost peak; and
a dial means attached to said member having numbers thereon which is adjustable to indicate the number of times said ball has travelled along said return track.

* * * * *